United States Patent
Smith et al.

(10) Patent No.: US 8,767,337 B2
(45) Date of Patent: Jul. 1, 2014

(54) DISK-SYNCHRONIZED LOADING/UNLOADING OF MAGNETIC HEAD

(75) Inventors: Craig Smith, Santa Clara, CA (US);
Bernhard Hiller, San Jose, CA (US);
Stan Shepherd, Morgan Hill, CA (US);
Erhard Schreck, San Jose, CA (US)

(73) Assignee: Seagate Technology, Cupertino, CA (US)

( * ) Notice: Subject to any disclaimer, the term of this patent is extended or adjusted under 35 U.S.C. 154(b) by 2348 days.

(21) Appl. No.: 11/736,441

(22) Filed: Apr. 17, 2007

(65) Prior Publication Data
US 2007/0242571 A1    Oct. 18, 2007

Related U.S. Application Data

(60) Provisional application No. 60/744,983, filed on Apr. 17, 2006.

(51) Int. Cl.
*G11B 5/596* (2006.01)

(52) U.S. Cl.
USPC .......................................................... 360/73.03

(58) Field of Classification Search
None
See application file for complete search history.

(56) References Cited

U.S. PATENT DOCUMENTS

| | | | |
|---|---|---|---|
| 6,414,812 B1 * | 7/2002 | Hattori | 360/73.03 |
| 6,711,109 B1 * | 3/2004 | Fukuda | 369/53.14 |
| 2004/0022153 A1 * | 2/2004 | Shen | 369/53.3 |
| 2004/0062163 A1 * | 4/2004 | Aso et al. | 369/53.3 |
| 2006/0044963 A1 * | 3/2006 | Takahashi | 369/44.28 |

* cited by examiner

*Primary Examiner* — Mark Blouin
(74) *Attorney, Agent, or Firm* — Braden Katterheinrich

(57) ABSTRACT

Systems and methods from loading/unloading a data head for a disk drive provide for more efficient use of disk space. A method of loading/unloading a data head for a disk drive comprises determining a disk phase of a spinning disk arrangement, determining a loading/unloading position based on the disk phase, and loading or unloading the data head on or from, respectively, the spinning disk arrangement based on the determined disk phase. The determining a disk phase may be based on zero crossing of voltages for a three-phase motor associated with the spinning disk arrangement.

17 Claims, 3 Drawing Sheets

– PRIOR ART –

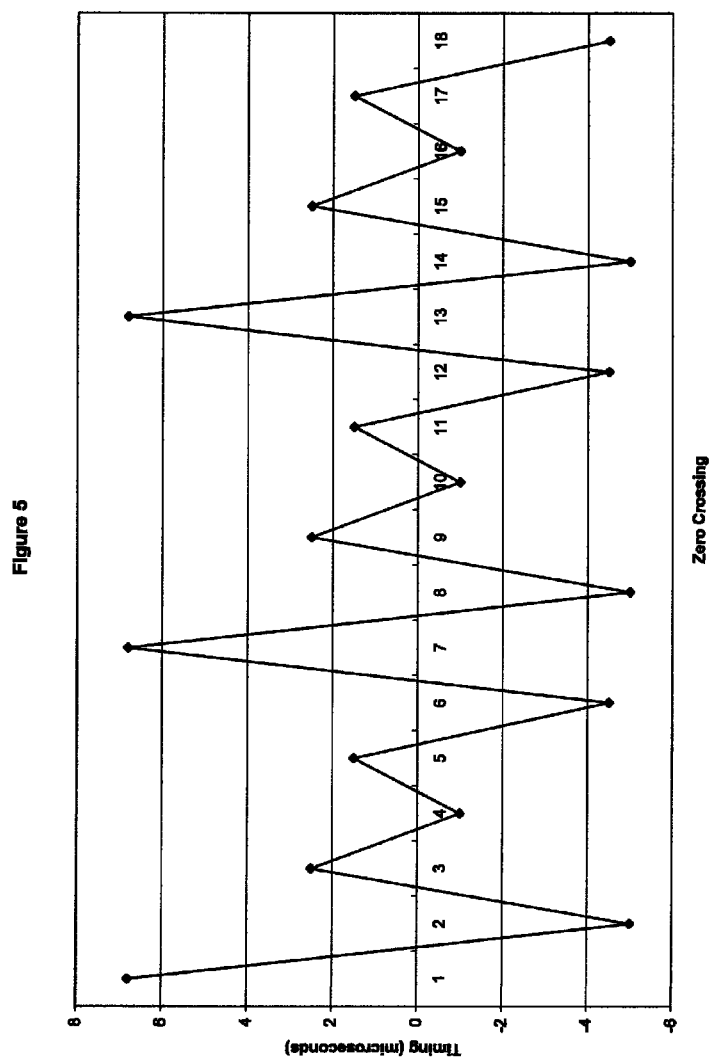

DISK-SYNCHRONIZED LOADING/UNLOADING OF MAGNETIC HEAD

CROSS-REFERENCE TO RELATED PATENT APPLICATIONS

This application claims priority under 35 U.S.C. §119(e) from U.S. Provisional Application Ser. No. 60/744,983, filed Apr. 17, 2006, incorporated herein by reference in its entirety.

BACKGROUND OF THE INVENTION

The present invention relates generally to the field of disk drives. More specifically, the invention relates to systems, methods and devices for loading or unloading a data head on or from, respectively, a disk.

Disk drives, as may be found in computers and like devices, typically include one or more disks with a surface on which data may be written. The data can then be read from the same disk when retrieval of the data is desired. The reading and writing of the data is accomplished by a data head which can take the form of a transducer. A single transducer can read, write or both.

In order to read or write, the data head must be positioned slightly above the spinning disk with an air bearing between the data head and the disk surface. When not in use, the data head may be positioned off the disk and safely stowed so as not to contact and damage the disk surface.

When positioning the data head above the disk or removing the data head from the disk, there is a danger of contact with the disk surface and resulting damage to the disk and data. To avoid this result, most disks are provided with a landing zone along the perimeter of the disk. FIG. 1 illustrates one such disk. The disk 10 includes a usable portion 12 on which data may be written and a landing zone 14 along the perimeter. Thus, for loading of the data head, the data head is moved to the landing zone 14 to form the air bearing and subsequently moved to the desired region of the usable portion. Similarly, for unloading, the data head is moved to the landing zone 14 with the air bearing intact and then removed from the disk 10. However, this arrangement results in a large area of the surface of the disk 10 being rendered unusable by designation as a landing zone 14.

SUMMARY OF THE INVENTION

Embodiments of the present invention overcome the above-described shortcomings in the prior art.

In one aspect of the invention, a method of loading/unloading a data head for a disk drive comprises determining a disk phase of a spinning disk arrangement, determining a loading/unloading position based on the disk phase, and loading or unloading the data head on or from, respectively, the spinning disk arrangement based on the determined disk phase.

In one embodiment, the disk phase includes at least one range of phases. The at least one range of phases may be an arc. In a preferred embodiment, each arc covers between 10 and 60 degrees of the perimeter of the spinning disk arrangement. In a further preferred embodiment, each arc covers between 20 and 50 degrees of the perimeter of the spinning disk arrangement. In a most preferred embodiment, each arc covers between 30 and 40 degrees of the perimeter of the spinning disk arrangement.

In one embodiment, the determining a disk phase is based on zero crossing of voltages for a three-phase motor associated with the spinning disk arrangement. The three-phase motor may have six zero crossings associated with each phase.

In another aspect, the invention relates to a disk drive arrangement comprising a spinning disk arrangement, a data head mounted on a data arm, and a controller adapted to load or unload the data head onto or from the spinning disk arrangement. The controller is adapted to determine a disk phase of the spinning disk arrangement, determine a loading/unloading position based on the disk phase, and load or unload the data head on or from, respectively, the spinning disk arrangement based on the determined disk phase.

In another aspect, the invention relates to a computer program product, embodied on a computer-readable medium, for displaying content on a device. The computer program product comprises computer code for determining a disk phase of a spinning disk arrangement, computer code for determining a loading/unloading position based on the disk phase, and computer code for loading or unloading the data head on or from, respectively, the spinning disk arrangement based on the determined disk phase.

BRIEF DESCRIPTION OF THE DRAWINGS

FIG. 5 is a chart exemplarily illustrating zero voltage crossings for a spindle motor for use with embodiments of the present invention.

DETAILED DESCRIPTION OF THE PREFERRED EMBODIMENTS

Figure 2:
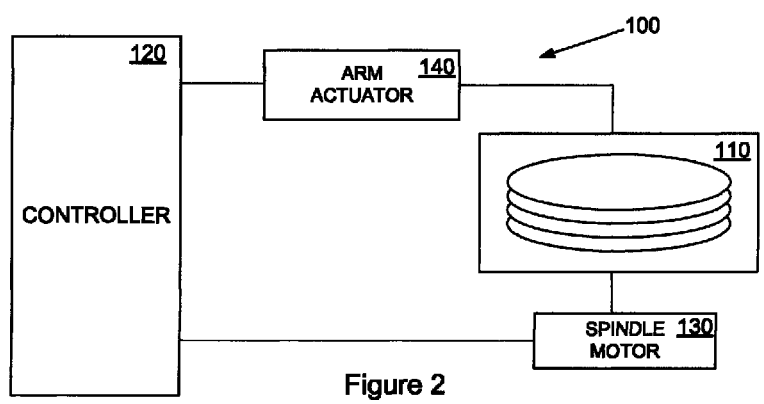
FIG. 2 is a block diagram illustrating a disk drive arrangement according to an embodiment of the present invention.

Referring to FIG. 2, an embodiment of a disk drive arrangement according to an embodiment of the invention is illustrated as a block diagram. The disk drive arrangement 100 includes a disk module 110 with one or more disks. Each disk in the disk module 110 is adapted to spin about a central axis. The disks in the disk module 110 may spin as a single unit.

The spin rate of the disks in the disk module 110 can vary depending on various factors, including processor speed, disk data density and disk size. Various disk modules 110 can have spin rates of, for example, 3600, 5200, 7200, 10,000 or 15,000 revolutions per minute (rpm). For a disk module 110 having a spin rate of 15,000 rpm, the disk makes one revolution in approximately 4 milliseconds (ms).

The disk drive arrangement 100 is provided with a spindle motor 130 coupled to the disk module 110. The spindle motor 130 drives the spinning of the disks of the disk module 110. The specific design of the spindle motor 130 may vary from one disk drive arrangement to another.

In addition to the spindle motor 130, the disk drive arrangement 100 also includes an arm actuator 140. The arm actuator 140 drives a data head assembly to be positioned either on or off the disk. The arm actuator 140 is adapted to move the data head to any desired radial position on the disk.

A drive controller 120 is coupled to the spindle motor 130 and the arm actuator 140 to control the operation of the disk drive arrangement 100. The drive controller 120 may also be coupled to other components of the disk drive arrangement 100 not shown in the illustrated example of FIG. 2. The drive controller 120 may be implemented in a variety of manners including, but not limited to, a software module or firmware.

Figure 3:
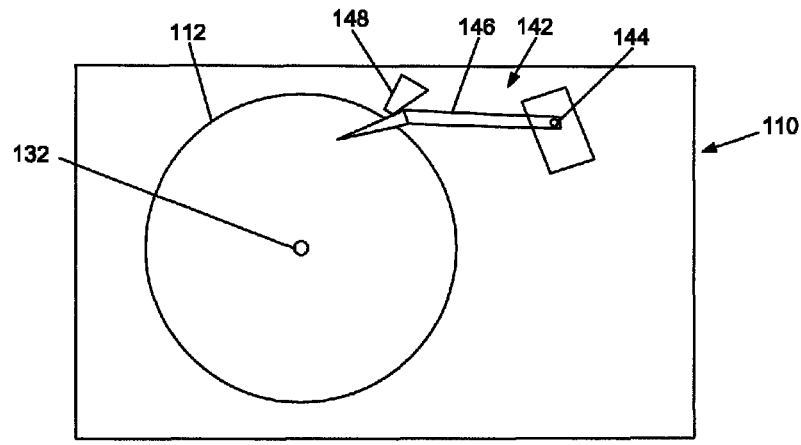
FIG. 3 is a plan view of a disk drive arrangement according to an embodiment of the present invention.

Referring now to FIG. 3, an embodiment of the disk module 110 is illustrated in greater detail. The disk module 110 includes a disk 112 on which data may be contained in the form of magnetic bits, for example. The disk 112 may be of a variety of sizes such as, for example, 3.5-inch diameter or 5.25-inch diameter disk. Those skilled in the art will understand that, in addition to size, such disks may vary in many factors, including, for example, in the material of which they are formed and the density of data they can accommodate. The disk 112 is adapted to spin about a central spindle 132 driven by the spindle motor described above.

The disk module 110 is provided with an arm assembly 142 adapted to read from and write to the disk 112. The arm assembly 142 exemplarily illustrated in FIG. 3 includes an arm 146 adapted to pivot about an arm pivot 144. The arm 146 may contain a data head on its free end. The data head may be a transducer adapted to manipulate or detect the magnetic material of the disk 112 to read or write data. The arm assembly 142 is also referred to in the art as a slider assembly.

A ramp 148 is provided in the disk module 110 to allow the arm to move onto and off the disk 112 in a gradual manner. In this regard, the ramp 148 is positioned proximate to the outer edge of the disk 112.

Figure 1:
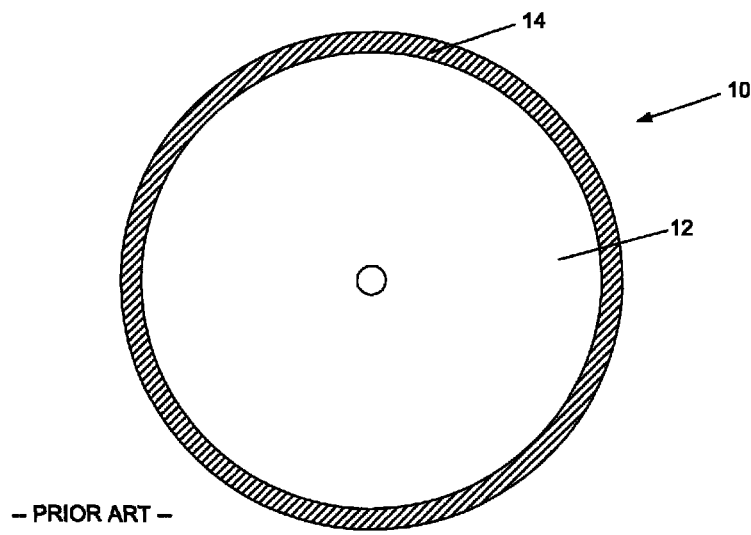
FIG. 1 is a plan view of a prior art disk.

Thus, during operation, when a read or write procedure is to be started, the spindle motor first spins the disk to a desired spin rate. As noted above, disk modules may be designed for various spin rates, such as 3600, 5200, 7200, 10,000 or 15,000 rpm. The data head is then positioned to the desired position above the disk 112. In moving the data head to this position, the arm is moved from its rest position (such as at the top of the ramp 148) down the ramp 148 toward the outer perimeter of the disk by use of the arm actuator. In this regard, the ramp 148 may be a wedge-shaped component which terminates at the outer perimeter of the disk 112 at approximately the desired height of the data head relative to the surface of the disk 112. As the arm 146 moves down the ramp 148 and above the disk 112, an air bearing is formed between the data head and the spinning disk 112 above the landing zone (as described above with reference to FIG. 1). Now, the data head can be moved to the desired position in the usable portion of the disk 112.

Similarly, when the data head is to be removed from the disk, the arm 146 is moved such that the data head is in the landing zone and onto the ramp. The spinning of the disk 112 is then stopped.

Figure 4:
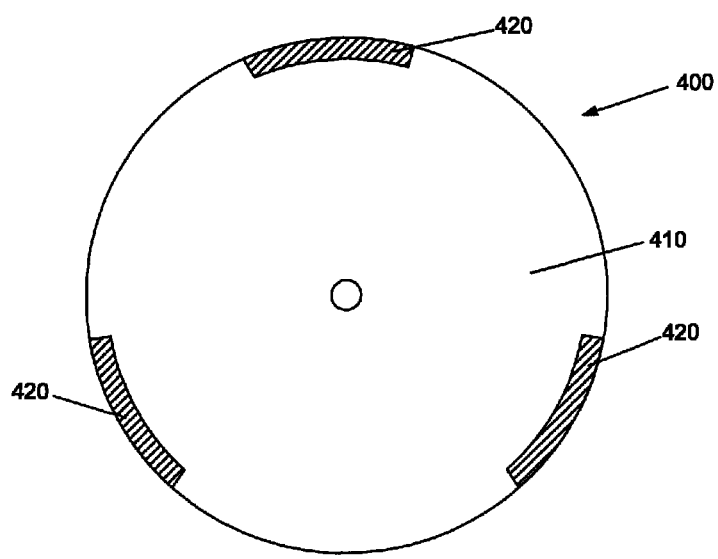
FIG. 4 is a plan view of a disk according to an embodiment of the present invention.

In accordance with embodiments of the present invention, the region of the disk rendered unavailable for data storage by designation as part of the landing zone is reduced. In this regard, as exemplarily illustrated in FIG. 4, the landing zone is determined based on the phase of the disk. For example, the embodiment of the disk 400 illustrated in FIG. 4, includes three landing zones 420 at portions of the perimeter of the disk 400, increasing the size of the usable portion 410 of the disk 400.

Thus, as the disk is spinning, the disk phase is determined, and the loading or unloading position on the disk (or landing zone) is determined based on the disk phase. The loading or unloading of the data head onto the disk is then initiated so that the data head loads or unloads at the loading or unloading position on the disk.

In one embodiment, the disk phase is determined by monitoring or detection of the zero voltage crossings of a three-phase spindle motor. Three-phase motors are well known in the art and do not require additional description here.

The zero crossings of a three-phase motor are based on the winding pattern of the motor. In one embodiment, a spindle motor has twelve zero crossings per revolution, corresponding to six zero crossings with each of the three phases of the motor. For an ideal (theoretical) three-phase motor, the zero-crossings are equally spaced. However, in real three-phase motors, slight variations in the windings cause the zero crossings to deviate from the ideal timing. Such deviations can be small, such as on the order of microseconds.

FIG. 5 is a chart illustrating the timing pattern of the zero crossings for one revolution of a three-phase motor with twelve zero crossings per revolution. The horizontal axis of the chart indicates the zero crossings in succession during a revolution. The vertical axis of the chart indicates the deviation in the timing from the ideal of each zero crossing. Thus, the first zero crossing occurs approximately seven microseconds later than expected, while the second zero crossing occurs approximately five microseconds earlier than expected. Similar timings are illustrated for each of the other ten zero crossings. With the spindle motor driving the disk at a constant spinning rate, the pattern of the zero crossings repeats for each revolution. Minor perturbations may be experienced due to electrical noise, but the pattern is not significantly affected.

Within a single revolution, the pattern repeats three times. With the pattern recorded, a loading/unloading zone may be associated with a point in the pattern. For example, with the zero crossing pattern illustrated in FIG. 5, the second, eighth and fourteenth zero crossings may be selected to correspond to the loading/unloading zone. Thus, the arm actuator is timed to load or unload the data head from the disk when the disk phase corresponds to one of the three zero crossings associated with the loading/unloading zone.

In other embodiments, a single zero crossing may be uniquely identified. In this regard, a single loading/unloading zone may be allocated to correspond to the single zero crossing. Further embodiments may include any practical number of loading/unloading zones corresponding to the practical number of identifiable zero crossings.

Thus, small regions on the perimeter of the disk may be associated with the loading or unloading of the data head, while the remainder of the perimeter of the disk is available for data storage. In the illustrated embodiment, the loading/unloading zones 420 (FIG. 4) are formed as arcs along the perimeter. In one embodiment, each arc of loading/unloading zone 420 has a radial width of between 100 and 1000 microns. In one example, for a disk having a spin rate of 15,000 rpm, the length of each arc may encompass between 10 and 60 degrees of rotation of the perimeter of the disk, preferably between 20 and 50 degrees, and more preferably between 30 and 40 degrees.

In one embodiment, with the disk having a spin rate of 6,000 rpm, each revolution takes approximately ten (10) ms. The accuracy of measurement of the disk phase using the timing of the zero crossings may be between 200 nanoseconds and 2 microseconds. Further, the accuracy with which the arm and data head can be loaded or unloaded may be between 100 and 500 microseconds. With these inaccuracies, each loading/unloading regions should account for approximately five percent (5%) of the perimeter region. Thus, in embodiments having three loading/unloading zones, approximately fifteen percent (15%) of the perimeter region is allocated for loading/unloading zones. For disks with faster spinning rates, a larger portion of the arc may be required.

Thus, up to eighty-five percent (85%) of the perimeter region can be recovered for use for data storage rather than loading/unloading zone.

The foregoing description of embodiments of the invention has been presented for purposes of illustration and description. It is not intended to be exhaustive or to limit the invention to the precise form disclosed, and modifications and variation are possible in light of the above teachings or may be acquired from practice of the invention. The embodiments were chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

What is claimed is:

1. A method of loading/unloading a data head for a disk drive, comprising:
   determining a disk phase of a spinning disk arrangement; and
   determining a loading/unloading position based on the disk phase; and
   loading or unloading the data head on or from, respectively, the spinning disk arrangement based on the determined disk phase.

2. The method of claim 1, wherein the disk phase includes at least one range of phases.

3. The method of claim 2, wherein each of the at least one range of phases is an arc.

4. The method of claim 3, wherein each arc covers between 10 and 60 degrees of the perimeter of the spinning disk arrangement.

5. The method of claim 4, wherein each arc covers between 20 and 50 degrees of the perimeter of the spinning disk arrangement.

6. The method of claim 5, wherein each arc covers between 30 and 40 degrees of the perimeter of the spinning disk arrangement.

7. The method of claim 1, wherein the determining a disk phase is based on zero crossing of voltages of a three-phase motor associated with the spinning disk arrangement.

8. The method of claim 7, wherein the three-phase motor has six zero crossings associated with each phase.

9. A disk drive arrangement, comprising:
   a spinning disk arrangement;
   a data head mounted on a data arm; and
   a controller adapted to load or unload the data head onto or from the spinning disk arrangement,
   wherein the controller is adapted to: determining a disk phase of the spinning disk arrangement; determine a loading/unloading position based on the disk phase; and load or unload the data head on or from, respectively, the spinning disk arrangement based on the determined disk phase.

10. The disk drive arrangement of claim 9, wherein the controller is adapted to control an arm actuator to load or unload the data head.

11. The disk drive arrangement of claim 9, wherein the disk phase includes at least one range of phases.

12. The disk drive arrangement of claim 11, wherein each of the at least one range of phases is an arc.

13. The disk drive arrangement of claim 12, wherein each arc covers between 10 and 60 degrees of the perimeter of the spinning disk arrangement.

14. The disk drive arrangement of claim 13, wherein each arc covers between 20 and 50 degrees of the perimeter of the spinning disk arrangement.

15. The disk drive arrangement of claim 14, wherein each arc covers between 30 and 40 degrees of the perimeter of the spinning disk arrangement.

16. The disk drive arrangement of claim 9, wherein the controller is adapted to determine a disk phase based on zero crossing of voltages of a three-phase motor associated with the spinning disk arrangement.

17. The disk drive arrangement of claim 16, wherein the three-phase motor has six zero crossings associated with each phase.

* * * * *